United States Patent Office 2,940,382
Patented June 14, 1960

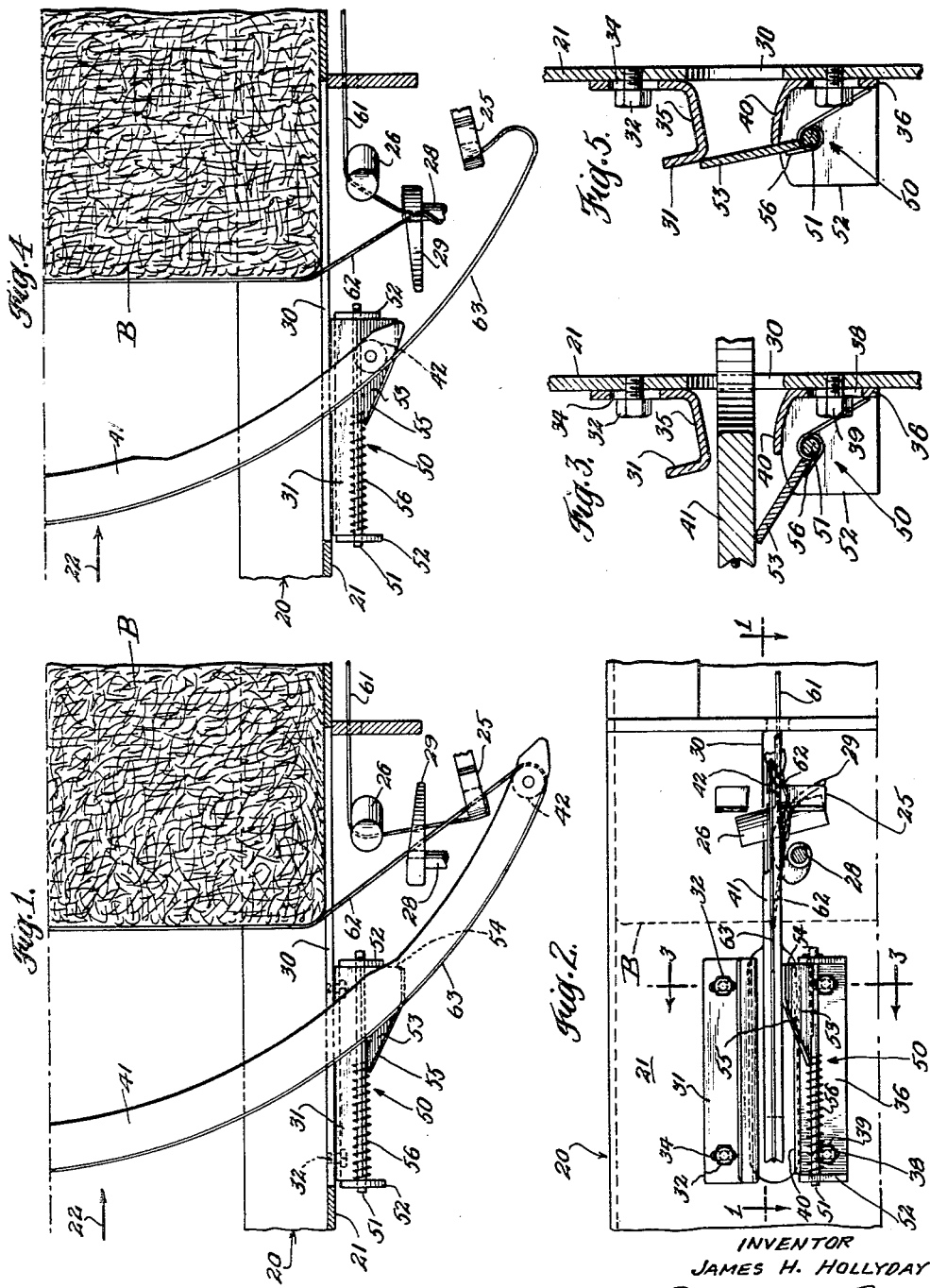

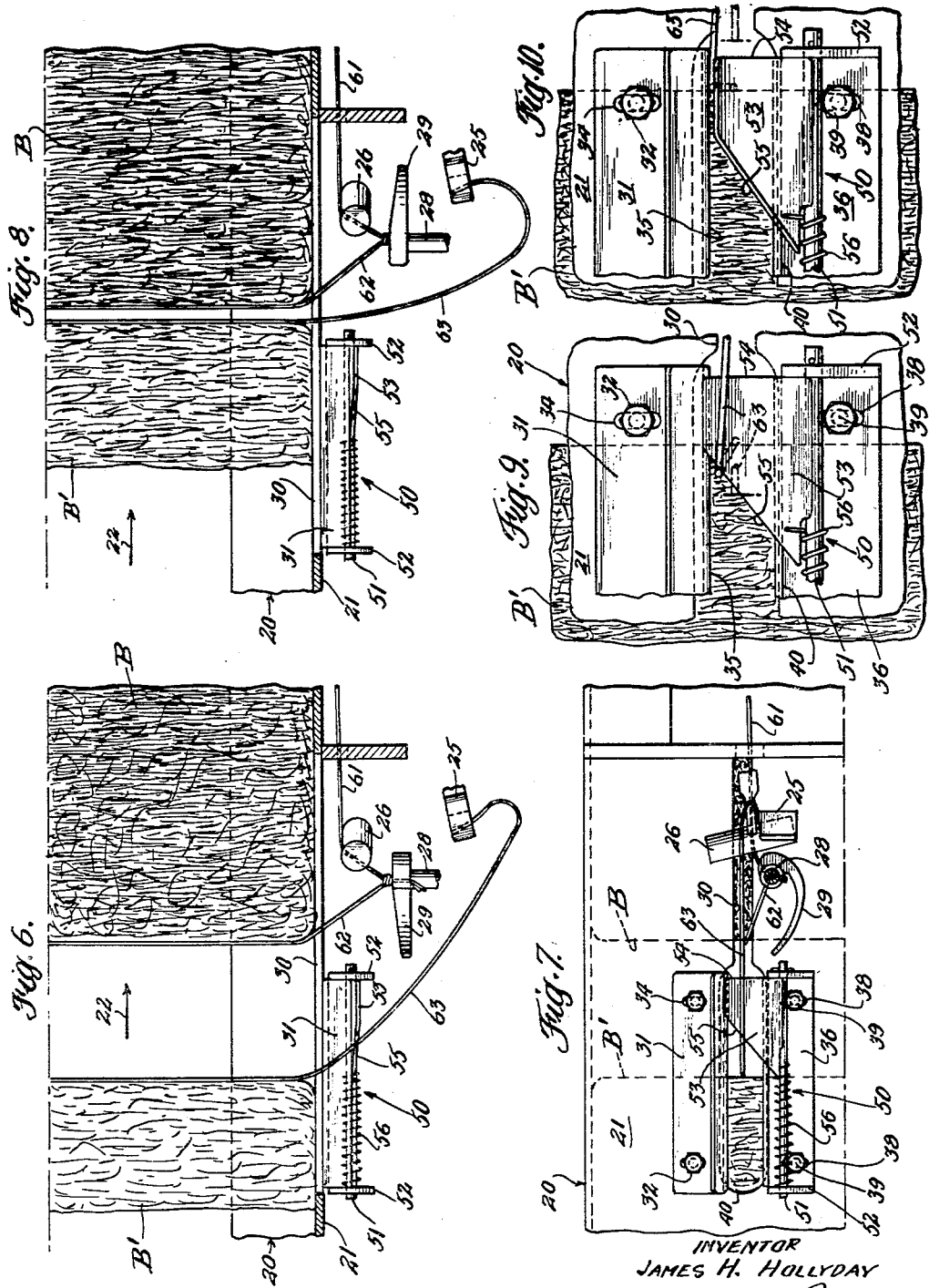

2,940,382
WIRE TIE HAY BALER

James H. Hollyday, New Holland, Pa., assignor to Sperry Rand Corporation, New Holland, Pa., a corporation of Delaware Filed Aug. 5, 1958, Ser. No. 753,369

3 Claims. (Cl. 100—21)

The present invention relates to wire tie hay balers, and more particularly to a hay baler having a tying mechanism such as that shown in U.S. Patent No. 2,551,873, issued May 8, 1951.

In the baler shown in the above-mentioned patent, there is a bale case into which crop material is delivered. A plunger, reciprocable in the case, compresses the material so delivered into bales and moves each bale as it is formed toward a rearward end of the bale case. At one side wall of the bale case there is provided a pair of wire clamps, each of which holds a free end of wire. The wires extend from the clamps across the bale case to the opposite side wall thereof and then to a supply source. As a bale takes form in the bale case, it moves rearwardly and against the wires causing them to extend around two sides and one end of the bale. When the bale is completely formed, a tripping mechanism actuated by a rotatable metering wheel institutes a tying operation. Loops of wire are projected from the opposite side of the bale case, where the wire supply is located, and around the forward end of the bale. Such wires are delivered to the side of the bale case having the wire clamps, and one strand of each loop is laid across one of the clamped free ends. A twister hook rotatably mounted adjacent each clamp is rotated, such hook engaging the wires where they cross and twisting them together. A free end strand and one of the strands delivered from the opposite side of the bale case comprise a tie. The other strand of each loop is cut and clamped and provides the new free end wire for the formation of the next bale.

The free end wires held in the clamps as the bale takes form, are commonly referred to as the No. 1 wires. The strands of the loops which are twisted with the free end wires are referred to as the No. 2 wires. The No. 2 wires are the rearward strands of the loops delivered by the needles. The other strands of the loops, that is the forward strands which become the new free end wires, are referred to as the No. 3 wires. Hereinafter, the respective wires will be referred to by these designations.

When the No. 1 and No. 2 wires are twisted together by the twister hook, it is essential that the associated No. 3 wire be kept out of the twisting operation. Otherwise the mechanism will be fouled. This has been a problem heretofore because the first wad of hay delivered rearwardly to start a new bale after one has been completed, engages the forwardly disposed No. 3 wire and forces it rearwardly. In some cases, the No. 3 wire passes into the orbit of the twister hook before the tying operation has been completed whereupon the hook catches onto it disrupting the operation of the baler.

A main object of this invention is to provide a wire separator in a baler of the character described, such separator being disposable between the No. 2 and No. 3 wires delivered by a needle and operable to retard or delay the rearward movement of the No. 3 wire.

Another object of this invention is to provide a device which will retard the rearward movement of the No. 3 wire without in any way affecting the No. 2 wire.

Another object of this invention is to provide a structure which is simple and economical, and readily attachable and detachable from a bale case.

Other objects of this invention will be apparent hereinafter from the specification and from the recital in the appended claims.

In the drawings:

Fig. 1 is a fragmentary section of a bale case, in plan, showing a wire separator constructed according to this invention. The separator is shown in opened position, a needle of the baler in projected position, and a wire twisting hook 360° from an at-rest position, and about to engage and twist two crossed wires;

Fig. 2 is a side view of Fig. 1;

Fig. 3 is an enlarged section taken on the line 3—3 of Fig. 2, looking in the direction of the arrows, and showing the wire separator opened by the projected needle;

Fig. 4 is a view similar to Fig. 1 but showing the needle partially retracted, the twister hook rotated an additional half revolution and the respective strands of the loop delivered by the needle separated from each other;

Fig. 5 is an enlarged sectional view similar to Fig. 3 but with the needle retracted and the separator closed;

Fig. 6 is a view similar to Figs. 1 and 4, but showing the needle fully retracted, the wire twisting hook nearing completion of an operating cycle, a new wad of hay being delivered toward the previously completed bale, and the new free end of wire disposed forwardly of the wire separator;

Fig. 7 is a side view of Fig. 6;

Fig. 8 is a view similar to Figs. 1, 4 and 6, but showing the wire tying operation completed and the free end of wire moved rearwardly and past the wire separator; and Figs. 9 and 10 illustrate the movement of the forward wire strand rearwardly and past the wire separator.

Referring now to the drawings by numerals of reference, 20 denotes a bale case which includes a side wall 21. B indicates a bale which has just been formed in the bale case. It is understood that the means for compressing hay into bales is conventional. Each bale as it is formed moves from left to right when viewed as shown in Figs. 1, 4, 6 and 8, as indicated by the arrow 22. Arrow 22 points in a rearward direction. The hay which is to form the next bale is delivered from a forward point toward the end of the completed bale B. The beginning of a new bale is indicated at B' in Figs. 6 and 8.

Mounted on side wall 21 is a wire cut-and-clamp device illustrated more or less diagrammatically at 25. Cut-clamp device 25 is suitably mounted on side wall 21 and spaced therefrom. Between the cut-clamp device and the bale case is a guide roller 26. Rotatable on an axis generally perpendicular to the bale case is a spindle 28 having a hook 29. Hook 29 is rotatable in a plane generally parallel to the side wall of the bale case and between the wire clamp device 25 and guide 26.

Side wall 21 has a fore-and-aft extending slot 30.

Mounted along the upper edge of slot 30 is a guide member 31 U-shaped in cross section and adjustably connected to the bale case side wall by a pair of bolts 32. Bolts 32 extend through vertically elongate slots 34 in the guide member which provide means for vertical adjustment of the member relative to the bale case. The guide member has a bight portion 35 which provides a guide surface adjacent the upper edge of slot 30.

Mounted on bale case 20 on side wall 21 and along the lower edge of slot 30 is a cooperative guide member 36 L-shaped in cross section and having vertically elongate slots 38 through which bolts 39 extend to thereby connect the guide member for vertical adjustment relative to the side wall 21. Guide member 36 has a portion 40 which together with the portion 35 of guide 31 define a guide passage for a needle 41.

Needle 41 is of conventional construction being of arcuate configuration and carried on a yoke, not shown, pivotally supported on bale case 20. Needle 41 is projectable across the bale case from one side wall to the opposite side thereof and then being adapted to return to an at-rest position outside the bale case. Needle 41 has a roller 42 at its free end around which a wire strand may pass. Needle 41 is so mounted that when it is projected across the bale case, it passes through the slot 30. The guide surfaces 35 and 40 insure that the needle is in proper position when it is fully extended across the bale case so that the tying medium will be accurately delivered to a twisting location.

The wire separator means of this invention is carried on the guide 36 and is generally denoted 50. It comprises a fore-and-aft extending pivot pin 51 supported at its respective ends in outwardly projecting ears 52 on guide member 36. Mounted on pivot pin 51 is a wire separator member 53 having a rearward edge 54 which extends perpendicular to pivot pin 51 and a forward edge 55 which extends diagonally relative to the pin.

The width of separator member 53 is such that it normally completely traverses the space between guide members 36 and 31 (Fig. 5) thereby overlying the slot 30. Moreover, the member 53 is mounted in the path of movement of the needle 41. A torsion spring 56 is provided which constantly biases separator member 52 to a closed position as shown in Fig. 5.

Operation

A No. 1 wire 61 is shown clamped at 25 (Fig. 1). Such wire extends from the clamp, over the guide 26 and then across the bale case 20 to a supply source, not shown. When the bale B is formed, it moves rearwardly and against the wire as indicated by the arrow 22. No. 1 wire 61 becomes extended rearwardly and around two sides and the rearward end of the bale. When the bale is completed, a metering mechanism, not shown, institutes the tying operation. Before the next bale is started, the needle 41 is projected across the bale case to loop the wire around the forward end of the completed bale. The wire projected around the forward end of the bale is denoted 62 or the No. 2 wire.

As shown in Fig. 1, the No. 2 wire is extended so that it crosses the No. 1 wire and is then deposited in the cut-clamp device 25. After the wires have been crossed, the spindle 28 is rotated in a clockwise direction (Figs. 2 and 7) whereby the wires 61 and 62 are engaged and a twist started. After a pretwist, Fig. 4, sufficient to hold the wires together, device 25 operates to sever the strand 62, one portion of the wire going into the wire twist and the other portion providing a No. 3 wire, destined to become the new No. 1 wire.

It will be noted that when the needle 41 delivers the loop of wire across the bale case, strand 62, or the No. 2 wire is disposed rearwardly while strand 63 or the No. 3 wire is disposed forwardly. Further, when the needle passes through the slot 30, it strikes the separator member 53 (Fig. 3) causing it to pivot about the fore-and-aft axis of pin 51. Thus, the separator member is held in opened inoperative position (Fig. 3) and in no way affects the proper laying of the No. 2 wire 62 by the needle. The separator member is so positioned that when the needle 41 is retracted, the spring 56 pivots the separator back to closed position as indicated in Fig. 5. When so disposed, the separator member projects between the No. 2 wire 62 and the No. 3 wire 63, Fig. 6. The No. 2 wire is rearwardly of the separator while the No. 3 wire is forwardly thereof.

The separator member 53 temporarily retards the rearward movement of the No. 3 wire 63. It retards it long enough for the twisting of the No. 1 and No. 2 wires to be completed.

As shown in Fig. 6, when the first wad of the new bale is driven rearwardly by the bale plunger, such new bale being indicated B', the wad is pushed against the No. 3 wire forcing it rearwardly. As shown in Figs. 9 and 10, the No. 3 wire is forced to slide along the diagonal edge 55 of the separator assuming a dotted line position 63 and gradually sliding towards the solid line position, Fig. 9. The extension of the No. 3 wire 63 and the rearward pull exerted upon it is directed against separator member 53 and tends to pivot it about the pin 51. The separator member becomes pivoted slightly as shown in Fig. 10, a sufficient amount to allow the No. 3 wire to pass between it and the guide member 31 and thereby move rearwardly and past the separator. Subsequently, the formation of the bale will cause the No. 3 wire to be extended around the guide 26 and to provide the new No. 1 wire for the next bale.

With the structure just described, the No. 2 wire is delivered in its proper position with no interference whatever from the separator device. However, the No. 3 wire 63 is retarded in its rearward movement thereby insuring that it will not be projected into the hook 29 before a tying operation has been completed.

While this invention has been described in connection with a particular embodiment thereof, it will be understood that it is capable of further modification and this application is intended to cover any variations, uses or adaptations of the invention, following, in general, the principles of the invention and including such departures from the present disclosure as come within known or customary practice in the art to which the invention pertains, and as fall within the scope of the invention or the limits of the appended claims.

Having thus described my invention, what I claim is:

1. An improvement in a wire tie baler having a bale case in which crop material is formed into bales, each bale moving from a forward and toward a rearward end of the bale case, said bale case having a side wall provided with an opening therein, a needle movable across said bale case to project a loop of wire around a forward end of a completed bale and through said opening, said loop including a forward strand and a rearward strand, said needle being retractable after projecting said loop and said forward strand being movable rearwardly by the next bale formed, and means for temporarily retarding rearward movement of said forward strand without interfering with the positioning of said rearward strand by said needle, the improvement residing in said retarding means and comprising a wire separator member mounted on said bale case side wall and pivotal relative thereto about a forward to rearward extending axis, said separator member having a closed position wherein it projects over said opening into the path of said needle and being pivotal therefrom to an opened position when engaged by the needle, means spring loading said separator member toward its closed position, said separator assuming a position between said rearward and forward strands after a loop of wire has been projected and said needle retracted, and means on said separator member engageable by said forward strand when the forward strand is moved rearwardly by a bale whereby the separator is moved from closed toward open position to allow the forward strand to pass rearwardly.

2. An improvement in a wire tie hay baler as recited in claim 1 wherein said separator comprises a flat plate having a one side edge pivotally connected to said bale case side wall, said pivot including a pivot pin, and said spring loading means comprising a torsion spring mounted on said pin.

3. An improvement in a wire tie hay baler as recited in claim 2 wherein said means on said separator member engageable by said forward strand comprises an edge of said plate diagonal to the axis of said pivot pin.

References Cited in the file of this patent

UNITED STATES PATENTS

| | | |
|---|---|---|
| 2,655,861 | Lizenbee | Oct. 20, 1953 |
| 2,736,256 | Walker | Feb. 28, 1956 |